United States Patent [19]

Flinchum

[11] Patent Number: 4,655,240

[45] Date of Patent: Apr. 7, 1987

[54] HYDRAULIC VOLUMETRIC PROPORTIONING VALVE

[76] Inventor: John A. Flinchum, 9111 White Bluff Rd. #137, Savannah, Chatham County, Ga. 31406

[21] Appl. No.: 716,846

[22] Filed: Mar. 28, 1985

[51] Int. Cl.$^4$ .............................................. G05D 7/01
[52] U.S. Cl. ...................................... 137/110; 60/593; 91/31; 91/38; 137/599; 251/16
[58] Field of Search ............... 91/31, 38; 60/384, 593; 251/16; 137/110, 599

[56] References Cited

U.S. PATENT DOCUMENTS 713,788  11/1902  Nethery ................................. 251/16
2,923,277  2/1960  Waterman ......................... 251/16 X
3,005,444  10/1961  Steibel ................................. 91/31 X
3,107,079  10/1963  Meddock ............................. 251/16
3,564,842  2/1971  Van Merle ....................... 60/593 X Primary Examiner—Robert G. Nilson
Attorney, Agent, or Firm—Donald R. Anderson

[57] ABSTRACT

A hydraulic volumetric proportioning valve which may be installed in pre-existing hydraulic systems such as aircraft landing gear extension and retraction systems to independently regulate and vary the rate of hydraulic system operation at desired stages of system operation in response to the volume of fluid flow through the system during each stage of system operation.

40 Claims, 5 Drawing Figures

HYDRAULIC VOLUMETRIC PROPORTIONING VALVE

BACKGROUND OF THE INVENTION

This invention relates to the art of controlling hydraulic fluid flow rates within a hydraulic system in proportion to a predetermined volume of flow within the system, and particularly the control of the rate of hydraulic fluid flow in an hydraulic aircraft landing gear extension and retraction system depending upon the position of the landing gear in the extension and retraction cycles.

As a part of the design of hydraulic aircraft landing gear extension and retraction systems, the rate at which the system operates is generally established by the design characteristics of the hydraulic landing gear actuator mechanism in combination with the capabilities of the hydraulic system which operates the actuator mechanism. In order to vary the rate at which the landing gear extends or retracts at various different points in the operational cycle, it is generally necessary to design the actuator in such a manner that the rate of extension or retraction at various points in the cycle is a fixed function of actuator design. Thus, once the actuator is designed, it has not been possible to change the rate of landing gear extension or retraction at any stage in the operational cycle without either affecting the overall rate of operation of the landing gear extension and retraction throughout the cycle, or without redesigning the actuator itself to provide a changed rate of operation at the desired stage in the landing gear extension and retraction without affecting the rate of operation at other stages.

The significance of being able to vary the rate of system operation at different points in the cycle independently of affecting system operation at other points in the cycle is that the factors which regulate acceptable rates of operation are different at various stages in the operation of the system. For example, a primary requirement of system operation is speed in order to assure rapid landing gear retraction and extension to meet aircraft performance requirements. Conversely, at other points in the operational cycle, the speed of operation must be slowed to avoid excessive noise or potential damage to the landing gear system and to the aircraft as the landing gear approach the fully retracted or fully extended positions.

Further, depending upon design changes in the landing gear system, the points in the operational cycle at which the rate of system operation must be regulated and the specific rates of operation which are acceptable may change. For example, if the weight of the landing gear is increased or decreased, then the point at which the rate of landing gear extension or retraction should be slowed will also change in order to assure that the heavier or lighter landing gear will retract wihout imposing excessive mechanical loads on the system, while at the same time assuring sufficient rate to assure smooth landing gear operation uninterrupted by aerodynamic loads.

Thus, it appears that the need existed for a method or apparatus for independently regulating the rate of system operation at varing and different stages in the operational cycle, without the need for expensive redesign of the landing gear actuator mechanism whenever a change was made in other parts of the landing gear system. Additionally, because of the varying aerodynamic loads imposed on the system during its operational cycle, it also would be necessary to provide a method and apparatus which would uniformly and consistently regulate such rates of operation as a function of the specific position of the landing gear in the operational cycle, without being affected by varying aerodynamic loads which might cause differing retraction or extension times under varying circumstances.

SUMMARY OF THE INVENTION

It has been found that the rate of landing gear system operation can be independently regulated at various stages in the operational cycle of such system by the use of the present invention to direct the hydraulic flow in the hydraulic system providing motive power to the landing gear extension and retraction system through one or more specially designed alternative hydraulic circuits, in response to the volume of hydraulic fluid flow which has passed through the system at any given point in the operational cycle. In this manner, the present invention achieves the objective of independently varying and regulating the rate of landing gear system operation at different predetermined points and stages in the operational cycle of the system.

It is a further objective of the present invention to provide a means for independently varying and regulating the rate of operation of the landing gear system at predetermined points in the operational cycle of such system, such that the operation of the landing gear system is uniform regardless of varying aerodynamic loads.

It is an additional objective of the present invention to provide a means for independently varying and regulating the rate of operation of a landing gear system at predetermined points in the operational cycle of the system without the need for redeisgning the hydraulic landing gear actuator mechanism.

It is still another objective of the present invention to provide a means for independently varying and regulating the rate of operation of a landing gear system at predetermined points in the operational cycle of the system, which means will automatically be reset upon the completion of each operational cycle of the system.

The foregoing objectives and still other objectives and advantages of the present invention will become apparent upon reading the following specification describing one preferred embodiment of the invention and also by reading the claims and referring to the following drawings in which the numbered parts of the embodiment described in the specification are shown by like numbered parts in the drawings.

DESCRIPTION OF A PREFERRED EMBODIMENT

It will be understood that the following description of a preferred embodiment of the present invention is set forth solely for the purpose of enabling persons skilled in the art to make and use the present invention according to the inventor's preferred embodiment.

This preferred embodiment will be referred to hereinafter for convenience in identification as the hydraulic volumetric proportioning valve, but it will be understood that such reference to the preferred embodiment of the present invention and the description set forth herein is of only one preferred embodiment of the invention and is not intended to limit or to restrict in any way the scope of the present invention. The scope of the present invention is intended to be limited only by reference to the appended claims.

Figure 1:
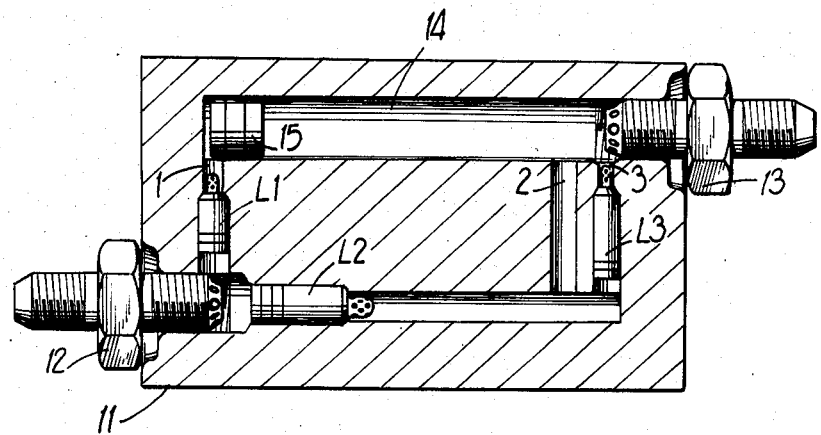
FIG. 1 is a cut-away view of the preferred embodiment of the hydraulic volumetric proportioning valve.

The preferred embodiment of the hydraulic volumetric proportioning valve is shown in FIG. 1. It includes a body 11 having a single inlet 12 for hydraulic fluid to enter the body 11 of the valve and a single output 13 for hydraulic fluid to be discharged from the body 11. As such the valve is designed to be placed directly in line with the source of hydraulic fluid providing hydraulic motive power to the landing gear actuator during the operational cycle of the landing gear extension and retraction system.

The inlet 12 and the outlet 13 include fittings of conventional design compatible with the aforesaid installation of the hydraulic volumetric proportioning valve at the desired point in the hydraulic system providing motive power to the landing gear actuator of the landing gear extension and retraction system. In the preferred embodiment set forth herein, such fittings are modified AN 815-4 fittings adapted to installation in the inlet 12 and the outlet 13 of the hydraulic volumetric proportioning valve.

Within the body 11 of the hydraulic volumetric proportioning valve are located a plurality of channels which govern the varying modes of operation of the valve. The preferred embodiment of the hydraulic volumetric proportioning valve designed for use in the landing gear extension and retraction system of aircraft includes three interior channels metering channel 1, initial channel 2, and alternative channel 3, respectively, which interior channels are in communication between the inlet 12 and a shuttle valve channel 14. The output of the shuttle valve channel 14 is in communication with the outlet 13.

The metering channel 1 enters the shuttle valve channel 14 at the upstream end of said shuttle valve channel 14, such that the flow of fluid through said metering channel 1 causes the shuttle 15 to move along the length of the shuttle channel 14 when flow is established into the valve through the inlet 12.

The initial channel 2 enters the shuttle valve channel 14 near the downstream end of the shuttle channel 14, such that the flow of fluid through said initial channel 2 is in communication with the outlet 13 when flow is initiated into the shuttle valve channel 14 through the inlet 12. However, the position of the entrance of the initial channel 2 into the shuttle valve channel 14 is at a point at which the flow of hydraulic fluid through said initial channel 2 to the outlet 13 is suspended once the shuttle 15 reaches and blocks the entrance of the initial channel 2 into the shuttle valve channel 14.

The alternative channel 3 enters the shuttle valve channel 14 at the extreme downstream end of the shuttle channel 14. Further, the position of the entrance of the alternative channel 3 into the shuttle valve channel 14 is at a point at which the shuttle 15 does not block any flow of fluid from the entrance of alternative channel 3 through the shuttle valve channel 14 to the outlet 13 even when the shuttle 15 is fully displaced downstream in said shuttle valve 14.

The rate of flow through interior channels 1 and 3 is restricted by the use of liquid flow restrictors L1 and L3, respectively. Additionally, the flow through the initial channel 2 and through the alternative channel 3 is restricted by the use of liquid flow restrictor L2, placed upstream of the junction of interior channels 2 and 3. The liquid flow restrictors may be of the type manufactured and sold by the Lee Company, Westbrook, Connecticut, for use in hydraulic systems.

As discussed more fully in the publication entitled "Handbook on Liquid Flow Restrictors", published by the Lee Company, the liquid restrictor is a device installed within a channel or orifice to restrict the flow of hydraulic fluid through such channel or orifice in response to the hydraulic pressure differential across said liquid restrictor, in much the same way that a resistor in an electrical circuit restricts the flow of current in an electrical circuit in response to the voltage differential across the resistor. The basic unit of measure of performance of such liquid restrictor is the Liquid Ohm (LOHM), which is defined as follows:

$$L = 20 \sqrt{(P_{input} - P_{output})} /Q \qquad \text{Equation 1}$$

where L is the value of the liquid restrictor in LOHMs, P is the hydraulic pressure across the liquid restrictor, and Q is the rate of flow of hydraulic fluid.

The regulation of flow rates through the interior channels 1, 2, and 3 also may be controlled by any other means capable of regulating flow in response to the difference in hydraulic pressure across the interior channel. Additionally, a variable means for regulating and varying the flow in response to a given pressure differential across one or more the interior channels also would achieve the objects of the present invention.

The basic underlying concept of operation of the hydraulic volumetric proportioning valve is to permit a predetermined volume of hydraulic fluid to flow through said valve at a desired higher flow rate as the shuttle 15 moves downstream after flow is initiated, until the shuttle 15 reaches the point at which the initial channel 2 enters the shuttle valve channel 14, whereupon the flow through said initial channel 2 is blocked and the flow rate through the hydraulic volumetric proportioning valve is limited and reduced to the flow through the parallel alternative channel 3 to the output 13.

As will be set forth more fully below, the initial and the reduced flow rates and the predetermined volume of flow required to move the shuttle 15 to the point at which the initial channel 2 enters the shuttle valve channel 14, all can be established by the appropriate design of the shuttle valve and placement of the entrance for the initial channel 2 into said shuttle valve channel 14, and the selection of the appropriate liquid restrictors L1, L2, and L3.

Figure 2:
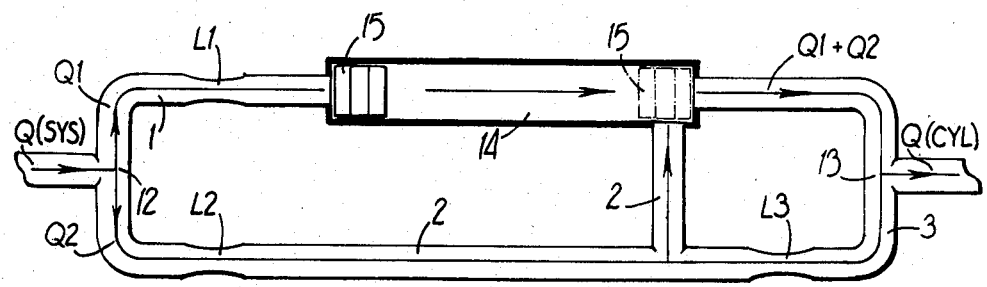
FIG. 2 is a schematic diagram of the preferred embodiment of the hydraulic volumetric proportioning valve.

Referring now to FIG. 2, the schematic diagram of the hydraulic volumetric proportioning valve in operation from the initial or reset position to the point at which the entrance of the initial channel 2 into the shuttle valve channel 14 is shown. This cycle of operation is referred to as the free stroke mode. During the free stroke mode, the hydraulic volumetric proportioning valve permits flow of hydraulic fluid at the highest rate, before limiting and restricting such flow during the subsequent cycles of operation.

In the preferred embodiment, the point in the operational cycle at which the free stroke ends is determined by the volume of fluid V1 which is required to move the shuttle 15 from its initial or reset position to the downstream position at which it covers the entrance of initial channel 2 into the shuttle valve channel 14. Further, since the pressure differential across L1 and L2 is virtually equal, the ratio of such volume of fluid V1 to the volume of fluid V2 which passes through the initial channel 2 to the shuttle valve channel 14 and then to the output 13, is inversely proportional to the ratio of the values of the restrictors L1 and L2, such that $$V1/V2 = L2/L1 \qquad \text{Equation 2.}$$

Accordingly, the point in the operational cycle at which V1 is reached is always the same with regard to V2, and only the predetermined volume V2 is allowed to pass through the initial channel 2 into the shuttle channel 14 during the free stroke mode before such flow Q2 is stopped by the shuttle 15. Further, in view of the minimal magnitude of V1, the total flow through the discharge outlet 13 (and hence the volumetric proportioning valve) during the free stroke cycle also is essentially equal to V2. (It should be noted that during the free stroke mode, the pressure differential across L3 is zero, and therefore there is no flow through alternative channel 3 into the shuttle valve channel 14.)

Of course, the time required for the free stroke cycle also will vary depending upon the specific pressure differential across L1 and L2 as a result of system design and external loads on the system. But, since the time for the shuttle 15 to sweep the shuttle channel 14 in the free stroke mode is a function of the rate Q1 at which the volume V1 is introduced into the shuttle channel 14, the time period of the free stroke mode is inversely proportional to the rate Q1 at which hydraulic fluid flows into the shuttle channel 14. Further, referring back to Equation 1, the time of the free stroke therefore also is inversely proportional to the square root of the pressure differential, which means that the motive pressure in the system must quadruple in order to double the speed at which the system operates.

In practice, the volume V1 can be established by the size of the shuttle channel 14, the size of the shuttle 15 or the location of the entrance of initial channel 2 into the shuttle channel 14. In the preferred embodiment, V1 was set to be 0.25 cubic inches as a compromise between limiting the size of the shuttle channel 14 and the problem that if the size of the shuttle channel 14 is too small, then dimensional tolerances might have an undue effect on the accuracy of the hydraulic volumetric proportioning valve. In other applications, such volume obviously would require a case by case determination based upon the application and the desired accuracy and size of the hydraulic volumetric proportioning valve.

Figure 3:
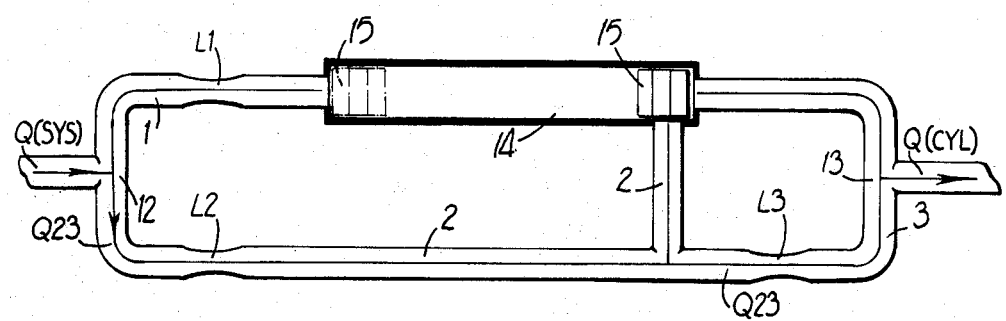
FIG. 3 is a schematic diagram of the preferred embodiment of the hydraulic volumetric proportioning valve.

Referring now to FIG. 3, a schematic diagram of the snub mode of operation is shown. The snub mode of operation is defined as the portion of the operational cycle at which the flow through initial channel 2 into the shuttle valve channel 14 is blocked or snubbed by the shuttle 15. Assuming that the shuttle 15 comes to rest on the downstream end of the shuttle valve channel at the same point in the operational cycle at which the snubbing of initial channel 2 occurs, the flow of fluid through output 13 during the snub mode is limited to the flow Q23 through alterntive channel 3 into the shuttle valve channel 14.

The flow through alternative channel 3 during the snub mode of operation is determined by the values of the restrictors L2 and L3. Unlike the calculation of resistence in series electrical circuits, in which the resistences are merely added to determine the total resistence, the effective value of two restrictors in series in fluid resistence is the square root of the sum of the squares of each such restrictor value. In other words, the effective restriction to flow Q23 is $$L23 = \sqrt{(L2)^2 + (L3)^2} \qquad \text{Equation 3}$$

Further, since the pressure differential across the hydraulic volumetric proportioning valve does not change as a result of the change from the free cycle mode to the snub mode, the ratio between Q2 and Q23 is again inversely proportional to the ratio between L2 and L23, such that $$Q2/Q23 = L23/L3 \qquad \text{Equation 4.}$$

The ratio of Q2/Q23 can be referred to as a speed reduction factor and can be used as the basis for determining the required value for L3. For example, if the speed of operation of the hydraulic system during the snub mode is to be ¼ the speed during the free cycle mode, then the speed reduction factor would be Q2/Q23=4, and L23=4(L2). Thus, the value of L3 can be established according to the following equation:

$$L3 = \sqrt{L23^2 - L2^2} \qquad \text{Equation 5}$$

Or, $$L3 = \sqrt{(4*(L2))^2 - (L2)^2} \qquad \text{Equation 6}$$

In this manner, in the preferred embodiment described herein, the value of L2 can be established initially based upon requirements for system speed during the fastest part of the cycle, the period of such fastest part of the cycle can be determined by the selection of L1 and the design of the shuttle channel 14 and shuttle 15, and the value of L3 can be determined by the speed reduction required during the snub mode of operation. Of course, it will be appreciated by those skilled in the art that the hydraulic volumetric proportioning valve also may be designed to provide more than two discrete periods and rates of operation by providing additional alternative channels, e.g., channel 4, channel 5, . . . channel n, and each channel entering the shuttle valve channel at a different point in order to determine the proportionate length of each period in the operational cycle, and each channel optionally having its own restrictor L4, L5, . . . Ln, if it is desired to regulate or restrict the speed of system operation during each period of the operational cycle.

Figure 4:
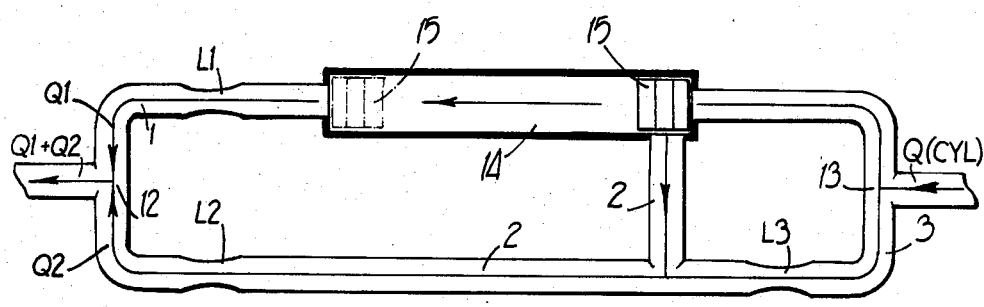
FIG. 4 is a schematic diagram of the preferred embodiment of the hydraulic volumetric proportioning valve.
Figure 5:
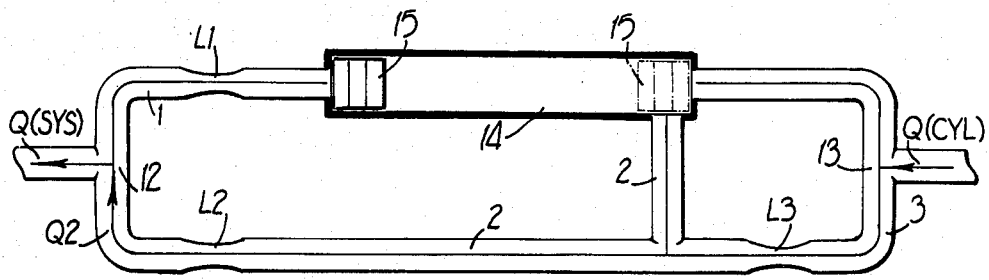
FIG. 5 is a schematic diagram of the preferred embodiment of the hydraulic volumetric proportioning valve.

Referring now to FIGS. 4 and 5, the reverse or reset mode of operation of the hydraulic volumetric proportioning valve is shown. Inasmuch as the initial reverse flow causes the shuttle valve 15 to move back upstream and uncover the entrance of initial channel 2 to the shuttle valve channel 14, the rate of such flow is Q1+Q2, and because of the small value of Q1 such reverse flow rate is dictated primarily by the value of L2. Further, once the volume V2 passes through the initial channel 2, then the volume V1 has moved the shuttle back upstream to its initial reset position. At that point in the reverse cycle, as shown in FIG. 5, the total reverse flow is limited to Q2 until the flow stops and the system is ready for the next operational cycle. It should be emphasized, however, that the position and orientation of the hydraulic volumetric proportioning valve in the system must be such that once reset, the shuttle 15 does not move downstream due to gravity or other forces between operational cycles of the gear extension and retraction system.

As set forth above, the hydraulic volumetric proportioning valve has been described in its application as a snubber to reduce the rate of system operation at a predetermined point in the operational cycle. The foregoing description has demonstrated the significance and the method of selection of the various values for the restrictors and other factors in design of the valve for such purpose. It should be pointed out that one additional advantage of the snubber, as opposed to simply reducing the average speed of hydraulic system operation, is that the greater initial speeds possible with the snubber often reduce the total time required for operation of the system.

Additionally, the hydraulic volumetric proportioning valve can be used as a fuse by blocking alternative channel 3. The advantage of the hydraulic proportioning valve as a fuse is that the fused volume can be varied simply by changing the ratio of L1 and L2. Similarly, the hydraulic volumetric proportioning valve also can be used as a hydraulic stop to interrupt or terminate system operation at desired points, even though the hydraulic actuators in the system have not reached their stops or bottomed out.

From the foregoing description, it will be seen that the present invention provides a hydraulic volumetric proportioning valve. It will be understood, however, by those skilled in the art that the present invention may be adapted to encompass other embodiments of the invention other than the preferred embodiment set forth above, and that the embodiments of the invention described above are merely illustrative, and that the present invention is limited solely by the appended claims.

I claim:

1. A hydraulic volumetric proportioning valve, including:
   (a) an input;
   (b) an output;
   (c) a means for varying the rate of fluid flow from said output in response to flow of a predetermined volume of fluid into said input, including:
      (i) an initial channel in communication with said input and said output; and
      (ii) a metering channel in communication with said input; and
      (iii) a means in communication with said metering channel for interrupting flow from said initial channel to said output in response to flow of a predetermined volume of fluid through said metering channel; and
      (iv) at least one alternative channel in communication with said input and said output.

2. A hydraulic volumetric proportioning valve, as claimed in claim 1, further including means for regulating the rate of flow of fluid through said initial channel in response to hydraulic pressure differential across said initial channel.

3. A hydraulic volumetric proportioning valve, as claimed in claim 2, wherein said means for regulating the rate of flow of fluid through said initial channel includes a liquid restrictor.

4. A hydraulic volumetric proportioning valve as claimed in claim 1, further including means for regulating the rate of flow of fluid through said metering channel.

5. A hydraulic volumetric proportioning valve as claimed in claim 1, further including means for regulating the rate of flow of fluid through said metering channel in response to hydraulic pressure differential across said metering channel.

6. A hydraulic volumetric proportioning valve as claimed in claim 5, wherein said means for regulating the rate of flow of fluid through said metering channel includes a liquid restrictor.

7. A hydraulic volumetric proportioning valve as claimed in claim 2, further including means for regulating the rate of flow of fluid through said metering channel.

8. A hydraulic volumetric proportioning valve as claimed in claim 2, further including means for regulating the rate of flow of fluid through said metering channel in response to hydraulic pressure differential across said metering channel.

9. A hydraulic volumetric proportioning valve as claimed in claim 8, wherein said means for regulating the rate of flow of fluid through said metering channel includes a liquid restrictor.

10. A hydraulic volumetric proportioning valve as claimed in claim 1, further including:
    (i) means for regulating the flow of fluid through said initial channel in response to hydraulic pressure differential across said channel, which means includes a liquid restrictor; and
    (ii) means for regulating the rate of flow of fluid through said metering channel.

11. A hydraulic volumetric proportioning valve as claimed in claim 10, wherein said means for regulating the rate of flow of fluid through said metering channel regulates said flow in response to hydraulic pressure differential across said metering channel.

12. A hydraulic volumetric proportioning valve as claimed in claim 11, wherein said means for regulating the rate of flow of fluid through said metering channel includes a liquid restrictor.

13. A hydraulic volumetric proportioning valve, as claimed in claim 1, further including means for regulating the rate of flow in said initial channel in proportion to the rate of flow in said metering channel.

14. A hydraulic volumetric proportioning valve, as claimed in claim 13, wherein the hydraulic pressure differential across said metering channel is equal to the hydraulic pressure differential across said initial channel, and wherein said means for regulating the rate of flow in said initial channel in proportion to the rate of flow in said metering channel further includes:

(1) means for regulating the rate of flow in said metering channel in response to said hydraulic pressure differential across said metering channel; and
(2) means for regulating the rate of flow in said initial channel in response to said hydraulic pressure differential across said initial channel.

15. A hydraulic volumetric proportioning valve, as claimed in claim 14, wherein said means for regulating the rate of flow in said metering channel includes a liquid restrictor.

16. A hydraulic volumetric proportioning valve, as claimed in claim 14, wherein said means for regulating the rate of flow in said initial channel includes a liquid restrictor.

17. A hydraulic volumetric proportioning valve as claimed in claim 14, wherein said means for regulating the rate of flow in said initial channel includes a liquid restrictor, and wherein said means for regulating the rate of flow in said initial channel includes a liquid restrictor.

18. A hydraulic volumetric proportioning valve, as claimed in claim 1, further including means for regulating the rate of flow of fluid through said alternative channel in response to the hydraulic pressure differential across said alternative channel.

19. A hydraulic volumetric proportioning valve, as claimed in claim 18, wherein said means for regulating the rate of flow of fluid through said alternative channel includes a liquid restrictor.

20. A hydraulic volumetric proportioning valve, including:
   (a) an input;
   (b) an output;
   (c) a means for varying the rate of fluid flow from said output in response to flow of a predetermined volume of fluid into said input, including:
      (i) an initial channel in communication with said input and said output;
      (ii) at least one alternative channel in communication with said input and said output;
      (iii) a metering channel in communication with said input; and
      (iv) a shuttle valve in communication between said metering channel and said output, said shuttle valve being further positioned between said initial channel and said output such that the flow of a predetermined volume of fluid from said input through said metering channel and into said shuttle valve will close said shuttle valve and interrupt the flow of liquid from said initial channel to said output.

21. A hydraulic volumetric proportioning valve, as claimed in claim 20, further including means for regulating the rate of flow of fluid through said initial channel in response to hydraulic pressure differential across said initial channel.

22. A hydraulic volumetric proportioning valve, as claimed in claim 21, wherein said means for regulating the rate of flow of fluid through said initial channel includes a liquid restrictor.

23. A hydraulic volumetric proportioning valve, as claimed in claim 20, further including means for regulating the rate of flow of fluid through said metering channel.

24. A hydraulic volumetric proportioning valve as claimed in claim 20, further including means for regulating the rate of flow of fluid through said metering channel in response to hydraulic pressure differential across said metering channel.

25. A hydraulic volumetric proportioning valve as claimed in claim 24, wherein said means for regulating the rate of flow of fluid through said metering channel includes a liquid restrictor.

26. A hydraulic volumetric proportioning valve, as claimed in claim 20, further including:
   (i) a means for regulating the rate of flow of fluid through said initial channel in response to hydraulic pressure differential across said initial channel; and
   (ii) a means for regulating the rate of flow of fluid through said metering channel.

27. A hydraulic volumetric proportioning valve as claimed in claim 26, wherein said means for regulating the rate of flow of fluid through said metering channel regulates said flow in response to hydraulic pressure differential across said metering channel.

28. A hydraulic volumetric proportioning valve as claimed in claim 27, wherein said means for regulating the rate of flow of fluid through said metering channel includes a liquid restrictor.

29. A hydraulic volumetric proportioning valve as claimed in claim 20, further including
   (i) means for regulating the rate of flow through said initial channel in response to hydraulic pressure differential across said first channel, wherein said means for regulating the flow thrrough said initial channel includes a liquid restrictor; and
   (ii) means for regulating the rate of flow of fluid through said metering channel.

30. A hydraulic volumetric proportioning valve as claimed in claim 29, wherein said means for regulating the rate of flow of fluid through said metering channel regulates said flow in response to hydraulic pressure differential across said metering channel.

31. A hydraulic volumetric proportioning valve as claimed in claim 30, wherein said means for regulating the rate of flow of fluid through said metering channel includes a liquid restrictor.

32. A hydraulic volumetric proportioning valve, as claimed in claim 30, further including means for regulating the rate of flow in said initial channel in proportion to the rate of flow in said metering channel.

33. A hydraulic volumetric proportioning valve, as claimed in claim 32, wherein the hydraulic presure differential across said metering channel is equal to the hydraulic pressure differential across said initial channel, and wherein said means for regulating the rate of flow in said first channel in proportion to the rate of flow in said metering channel further includes:
   (1) means for regulating the rate of flow in said metering channel in response to said hydraulic pressure differential across said metering channel; and
   (2) means for regulating the rate of flow in said initial channel in response to said hydraulic pressure differential across said initial channel.

34. A hydraulic volumetric proportioning valve, as claimed in claim 33, wherein said means for regulating the rate of flow in said metering channel includes a liquid restrictor.

35. A hydraulic volumetric proportioning valve, as claimed in claim 33, wherein said means for regulating the rate of flow in said initial channel includes a liquid restrictor.

36. A hydraulic volumetric proportioning valve as claimed in claim 33, wherein said means for regulating the rate of flow in said metering channel includes a liquid restrictor, and wherein said means for regulating the rate of flow in said initial channel includes a liquid restrictor.

37. A hydraulic volumetric proportioning valve as claimed in claim 20, wherein said means for varying the rate of fluid flow further includes: (iv) at least one alternative channel in communication with said input and said output.

38. A hydraulic volumetric porportioning valve, as claimed in claim 37, wherein said shuttle valve is in communication between said output and said alternative channel, and wherein said alternative channel enters said shuttle valve downstream of said initial channel.

39. A hydraulic volumetric proportioning valve, as claimed in claim 37, further including means for regulating the rate of flow of fluid through said alternative channel in response to the hydraulic pressure differential across said alternative channel.

40. A hydraulic volumetric proportioning valve, as claimed in claim 39, wherein said means for regulating the rate of flow of fluid through said alternative channel includes a liquid restrictor.

* * * * *